(12) United States Patent
Shinohara et al.

(10) Patent No.: US 9,261,637 B2
(45) Date of Patent: Feb. 16, 2016

(54) SURFACE LIGHT SOURCE DEVICE AND ITS LIGHT GUIDE PLATE

(71) Applicant: OMRON Corporation, Kyoto-shi, Kyoto (JP)

(72) Inventors: Masayuki Shinohara, Nagaokakyou (JP); Kazuhide Hirota, Moriyama (JP); Norikazu Kitamura, Kusatsu (JP); Takako Ishikawa, Kobe (JP)

(73) Assignee: OMRON Corporation, Kyoto (JP)

( * ) Notice: Subject to any disclaimer, the term of this patent is extended or adjusted under 35 U.S.C. 154(b) by 53 days.

(21) Appl. No.: 14/139,026

(22) Filed: Dec. 23, 2013

(65) Prior Publication Data

US 2014/0176876 A1    Jun. 26, 2014

(30) Foreign Application Priority Data

Dec. 26, 2012 (JP) .................................. 2012-283573
Oct. 30, 2013 (JP) .................................. 2013-225990

(51) Int. Cl.
*F21V 8/00* (2006.01)

(52) U.S. Cl.
CPC .............. *G02B 6/002* (2013.01); *G02B 6/0016* (2013.01); *G02B 6/0031* (2013.01); *G02B 6/0038* (2013.01)

(58) Field of Classification Search
CPC .. G02B 6/0038; G02B 6/0053; G02B 6/0016; G02B 6/0046; G02B 6/0028; G02B 6/0036; G02B 6/0061; G02B 6/0031; G02B 6/002; G02B 6/0035; G02B 6/0055; G02B 6/0043; G02B 6/005; G02B 6/0018; G02B 6/003; G02B 6/0025; G02B 6/0048; G02B 27/2214; G02B 27/0961; G02B 27/0972; G02B 27/2242; G02B 3/0056; G02B 3/0006; G02B 5/0215; G02B 5/0231; G06F 1/133615; G06F 1/133606; G06F 1/133524; G06F 1/133526; G06F 1/29; G06F 1/1336; G06F 1/133603; G06F 1/133611; G06F 1/133504; G06F 1/133605; B29D 11/00278; B29D 11/00365

USPC .......... 349/65, 62, 61, 95; 362/606, 607, 609, 362/626, 97.1, 97.2, 620, 615, 339, 617, 362/618, 625, 628, 326, 327, 341, 600, 610, 362/619, 623; 345/102, 87; 359/19

See application file for complete search history.

(56) References Cited

U.S. PATENT DOCUMENTS

2010/0182535 A1\* 7/2010 Mifune et al. .................. 349/62
2010/0195019 A1   8/2010 Shinohara et al.

FOREIGN PATENT DOCUMENTS

JP         5003758 B2    8/2012
JP         5088451 B2    12/2012
WO      2013/132661 A1   9/2013

*Primary Examiner* — Thoi Duong
(74) *Attorney, Agent, or Firm* — Osha Liang LLP

(57) ABSTRACT

A light guide plate has a light introduction part having an end face configured to have light incident thereon, and a light guide plate body disposed continuously to the light introduction part and comprising a thickness smaller than a maximum thickness of the light introduction part. The light guide plate body has a light emitting surface that emits the light incident from the end face. The light introduction part comprises an inclined face disposed on at least one side of the light guide plate. The inclined face is inclined smoothly from a surface of a part thicker than the light guide plate body toward an end of the light guide plate body. An optical pattern part has a linear pattern element is disposed near a region in a proximity of the inclined face in a face on a light exit side of the light guide plate body.

15 Claims, 18 Drawing Sheets

SURFACE LIGHT SOURCE DEVICE AND ITS LIGHT GUIDE PLATE

CROSS REFERENCE TO RELATED APPLICATIONS

This application claims priority to Japanese Patent Application No. 2012-283573 filed on Dec. 26, 2012, and Japanese Patent Application No. 2013-225990 filed on Oct. 30, 2013, the entire contents of which are incorporated by reference herein.

BACKGROUND

1. Field

The invention relates to a surface light source device and its light guide plate.

2. Related Art

In recent years, as the thickness of a mobile device decreases, a surface light source device which is assembled in a mobile device is also requested to become thinner and thinner. To reduce the thickness of the surface light source device, the thickness of the light guide plate has to be decreased. However, even if the thickness of a light guide plate having a flat plate shape is reduced, it is difficult to reduce the height of an LED light source. In the case of using a thin light guide plate having a flat plate shape, the height of the light source becomes larger than the thickness of an end face (light incident end face) of the light guide plate. As a result, a light source disposed so as to be opposed to the light incident end face of the light guide plate is protruded to above the top face of the light guide plate. In the case where the light source is protruded to above the top face of the light guide plate, all of light emitted from the light source does not enter the light incident end face of the light guide plate but a part of the light leaks to the outside of the light guide plate, so that the light use efficiency deteriorates.

To solve the technical problem, there is a case that a light guide plate 13 as illustrated in FIG. 1 is used. The light guide plate 13 has a light introduction part 14 thicker than a light guide plate body 15 at an end of the light guide plate body 15 having a flat plate shape. In the top face of the light introduction part 14, an inclined face 16 which is inclined from a part where the thickness is largest in the light introduction part 14 toward the end of the light guide plate body 15 is formed. A reflection sheet 19 is opposed in the lower face of the light guide plate 13. Since the thickness of the end face (light incident end face) of the light introduction part 14 is equal to or larger than the height of a light source 12, the light guide plate 13 can efficiently take the light of the light source 12 into the light introduction part 14 and guide the light to the thinner light guide plate body 15.

The light which enters the light introduction part 14 from the light incident end face is transmitted to the light guide plate body 15 while being totally reflected between the inclined face 16 and the lower face of the light introduction part 14. The incidence angle of the light propagating in the light guide plate body 15 when the light is incident on the top face of the light guide plate body 15 becomes smaller each time the light is reflected by the inclined face 16. Due to this, the light easily leaks from the top face of the light guide plate body 15 positioned in the proximity of the inclined face 16 to the outside of the light guide plate body 15. In particular, when the inclination angle of the inclined face 16 increases, the light leaks strongly from the top face of the light guide plate body 15 in the proximity of the inclined face 16.

To measure a distribution of light leaked from the top face of the light guide plate 13 having the inclined face 16, as illustrated in FIG. 1, a measuring device Dt is disposed so as to face the top face of the light guide plate 13. FIG. 2 illustrates a distribution of light intensity in a region R1 measured by the measuring device Dt and a distribution of light intensity in a region R2. As illustrated in FIG. 1, light leaked from a flat face part 16a continued to the upper end of the inclined face 16 and light leaked from the inclined face 16 will be examined separately in the top face of the light guide plate body 15. The amount of light leaked from the flat face part 16a is almost zero %. The amount of light leaked from the inclined face 16 is about 54% of the total. The amount of light leaked from the top face of the light guide plate body 15 is about 45% of the total. Therefore, the amount of light leaked from the inclined face 16 is larger than that of light leaked from the light guide plate body 15.

The light leaked from the inclined face 16 is concentrated in a part around the border with the light guide plate body 15 as illustrated in the region R1 in FIG. 2. The light leaked from the light guide plate body 15 is also concentrated in a part around the border with the inclined face 16 as illustrated in the region R2 in FIG. 2. Therefore, the light leaked from the top face of the light guide plate 13 is concentrated in the border part between the inclined face 16 and the light guide plate body 15. The amount of light leaked from the inclined face 16 is larger than that of light leaked from the inclined face 16 as described above. However, as understood from FIG. 2, the light leaked from the light guide plate body 15 is concentrated in a narrow range, and brightness is high, so that the light is conspicuous. Therefore, the light leakage in the region in the proximity of the inclined face, in the top face of the light guide plate body 15 has to be made small.

FIG. 3 illustrates a distribution of light leaked from the light guide plate 13 in a cross section passing the light emission center of the light source 12. The distribution calculated by simulation and it expressed in rays of light. Also from FIG. 3 also expresses that the light leakage is strong on the top face of the light guide plate body 15 near the inclined face.

One of surface light source devices in which light leakage is reduced is, for example, disclosed in JP 5003758 B. FIG. 4 is a perspective view illustrating a surface light source device 11 disclosed in JP 5003758 B. The surface light source device 11 comprises the light source 12 and the light guide plate 13. The light guide plate 13 is formed by integrating the light introduction part 14 having a wedge shape and the light guide plate body 15 having a flat plate shape. The light introduction part 14 has the inclined face 16 in its top face. The inclined face 16 is inclined from the end on the side of the light incident end face toward the end of the light guide plate body 15. In the inclined face 16 of the light introduction part 14, a directivity conversion pattern 17 is provided. The directivity conversion pattern 17 is made by a plurality of V grooves 18 arranged along the width direction of the light guide plate 13. There is a case that the directivity conversion pattern 17 is provided only in a forward region in the light source 12 and there is also a case that the directivity conversion pattern 17 is provided in the entire width of the light guide plate 13.

In the surface light source device 11, light incident on the inclined face 16 is reflected by V grooves 18, so that the incidence angle of light incident on the light guide plate body 15 in the proximity of the inclined face 16 becomes larger. As a result, leakage of light from the light guide plate body 15 is suppressed in the proximity of the inclined face 16.

In the structure such as the surface light source device 11, however, the directivity conversion pattern 17 has to be formed in the inclined face 16, so that a process of a mold or stamper for forming the light guide plate 13 is complicated, and it becomes very difficult to manufacture the mold and the stamper.

SUMMARY

One or more embodiments of the present invention provides a light guide plate having an inclined face in the proximity of a light incident end face, in which light leakage from the light guide plate body is suppressed in the proximity of the inclined face and, moreover, which can be easily manufactured. One or more embodiments of the present invention provides a surface light source device using the light guide plate.

A light guide plate according to one or more embodiments of the present invention includes: a light introduction part having an end face on which light is incident; and a light guide plate body provided continuously to the light introduction part and having a thickness smaller than maximum thickness of the light introduction part; wherein the light guide plate body includes a light emitting surface emitting the light incident from the end face, the light introduction part includes an inclined face which is provided on at least one side of the light guide plate, the inclined face is inclined smoothly from a surface of a part thicker than the light guide plate body toward an end of the light guide plate body; and an optical pattern part which includes a linear pattern element is provided near a region in the proximity of the inclined face in the face on the light exit side of the light guide plate body. The smooth inclined face means that a face does not have irregularity due to an optical pattern. The pattern element has, for example, a wedge projection shape or a groove projection shape.

Since the light guide plate according to one or more embodiments of the present invention has the light introduction part having the inclined face at the end of the light guide plate body, light from the light source can be efficiently introduced from the end face of the light introduction part and guided to the light guide plate body. However, in the case where the inclined face is simply provided, light is easily leaked from the proximity of the inclined face. On the other hand, in the light guide plate according to one or more embodiments of the present invention, the optical pattern part made of the linear pattern elements is provided in the proximity of the inclined face. Consequently, light leakage from the proximity of the inclined face is suppressed, the proximity of the inclined face can be prevented from locally shining, and light use efficiency can be improved. Moreover, the optical pattern part is provided in the face on the light exit side of the light guide plate body in the proximity of the inclined face. Therefore, as compared with the case of providing the optical pattern part in the inclined face, the process of a mold for manufacturing the light guide plate is facilitated, and the process cost of the mold can be reduced.

In a light guide plate according to one or more embodiments of the present invention, the optical pattern part is formed such that a ridge line and a valley line are alternately arranged along a width direction of the light guide plate, in a region positioned in front of a light source disposed opposite to the end face and having a width equal to that of the light source, in a section of the optical pattern part which is cut in parallel to the end face, a slant face connecting any of the ridge lines of the optical pattern part and one of valley lines adjacent to the ridge line and a slant face connecting the ridge line and the other valley line adjacent to the ridge line are asymmetric with respect to a straight line passing through the ridge line and perpendicular to the light emitting surface, and further, at least one set of the asymmetric shape parts having different shapes exists on both sides of a plane passing through center of light emission of the light source and perpendicular to the end face and the light emitting surface. The slant face in the optical pattern part is an inclined surface between a ridge line and a valley line in the optical pattern part, which may be a flat face or a curved face. In one or more embodiments, slant faces connecting the ridge line in the optical pattern part and the valley lines on both sides are asymmetric. Consequently, restrictions at the time of designing the optical pattern part become mild, light leakage from the optical pattern part is reduced, and the light use efficiency improves.

In one or more embodiments of the present invention, in a region positioned in front of the light source, having a width equal to that of the light source, and as at least one of two regions separated by the plane, in a section of the optical pattern part is cut in parallel to the end face, when a normal is set to a slant face connecting a ridge line and a valley line which are adjacent in the optical pattern part, from the inside to the outside, a sum of breadths of the slant faces in which the normal is slant toward the plane side may be larger than a sum of breadths of slant faces in which the normal is slant toward the side opposite to the plane. The sum of breadths of the slant faces of the optical pattern part is total of breadths of slant faces of the optical pattern part (that is, widths in a direction parallel to the end face), in at least one of two regions sandwiching the plane (hereinbelow, the plane, that is, a plane passing through light emission center of the light source and perpendicular to the end face and the light emitting surface will be called "light source center"). Light arrived from the light source is easily leaked from a slant face (hereinbelow, called a slant face of an external normal) in which the normal is inclined to the side opposite to the light source center more than a slant face (hereinbelow, called a slant face of an internal normal) in which the normal is inclined to the light source center side. In the optical pattern part of the mode, the sum of the breadths of the slant faces of the external normal is smaller than that of the breadths of the slant faces of the internal normal, so that the area of the slant face of the external normal in which light is easily leaked becomes narrow holistically. As a result, light leakage from the optical pattern part is suppressed, and light use efficiency can be improved.

According to one or more embodiments of the present invention, in a region positioned in front of the light source and having a width equal to that of the light source, in a section of the optical pattern part cut in parallel to the end face, breadth of the slant face in which the normal is inclined to the light source center side in the normals set to the two adjacent slant faces is larger than or equal to the breadth of the slant face in which the normal is inclined to the side opposite to the light source center. In such a mode, the breadth of the slant face with the external normal is smaller than that of the slant face with the internal normal, so that the area of the slant face with the external normal in which light is easily leaked becomes narrower, leakage of light from each of the pattern elements constructing the optical pattern part can be suppressed, and the light use efficiency improves.

In a light guide plate according to one or more embodiments of the present invention, at least a part of a valley line in the optical pattern part is located on the center side of the light guide plate body more than the light emitting surface. In the case where a pattern, for example, a lenticular lens is provided on the light emitting surface, the surface positioned at the height of the vertex of the pattern is set as a reference of the height of the light emitting surface. In one or more embodiments, at least a part of a ridge line in the optical pattern part may be located on the center side of the light guide plate body more than the light emitting surface. In one or more embodiments, at least a part of the valley line of the optical pattern part is positioned on the center side of the light guide plate body more than the light emitting surface. Consequently, as compared with the case where the entire optical pattern part lies out from the light emitting surface, the area of the end face on the side of the light emitting surface of the optical pattern part can be reduced. As a result, light leaked from the end face on the side of the light emitting surface side of the optical pattern part decreases, and local light emission can be suppressed.

In a light guide plate according to one or more embodiments of the present invention, the pattern element may extend in parallel to a direction perpendicular to the end face or the pattern elements may be arranged radially. The pattern elements may be aligned in parallel on both sides of the optical axis center and, when viewing from a direction perpendicular to the top face of the light guide plate body, the pattern elements may be inclined in directions opposite to each other on both sides of the optical center. In a light guide plate according to one or more embodiments of the present invention, the light emitting surface may have a lenticular lens extending in parallel to a direction perpendicular to the end face.

A surface light source device according to one or more embodiments of the present invention includes: the light guide plate according to one or more embodiments of the present invention; and a light source configured to transmit light to the end face of the light guide plate. In a surface light source device according to one or more embodiments of the present invention, since a light guide plate according to one or more embodiments of the present invention is used, local shining in the proximity of the inclined face of the light guide plate can be prevented, and the light use efficiency can be improved. Further, the cost of processing the mold for manufacturing the light guide plate can be reduced, so that the cost of the surface light source device can be also suppressed.

The light guide plate according to one or more embodiments of the present invention can be used for a liquid crystal display device. While suppressing cost, a high-quality liquid crystal display device can be provided.

A liquid crystal display device according to one or more embodiments of the present invention can be used for a mobile device such as a smartphone, a tablet computer, an electronic book reader, or an electronic dictionary.

Embodiments of the present invention may also be constructed by combining any of the above-described components. Embodiments of the present invention can employ many variations realized by combination of the components.

DETAILED DESCRIPTION

Hereinafter, embodiments of the present invention will be described with reference to the appended drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The present invention, however, is not limited to the following embodiments but can be variously changed without departing from the scope of the invention.

First Embodiment

Figure 1:
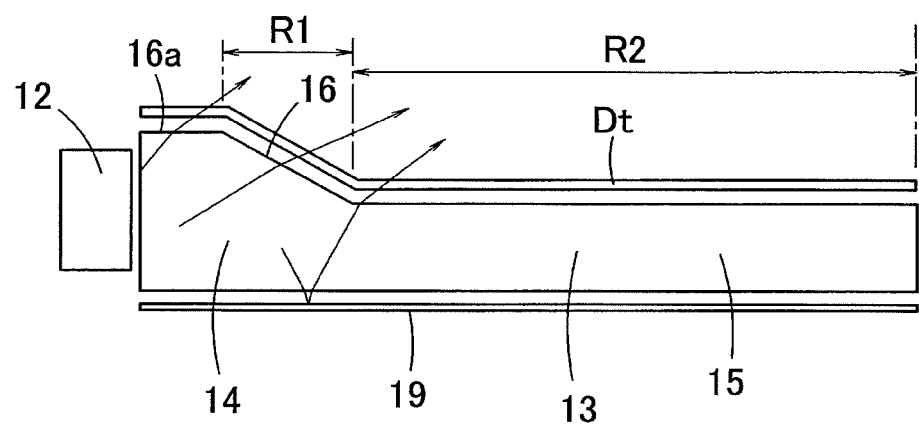
FIG. 1 is a schematic cross section illustrating a device for measuring a distribution of leak amounts of light from a light guide plate.
Figure 2:
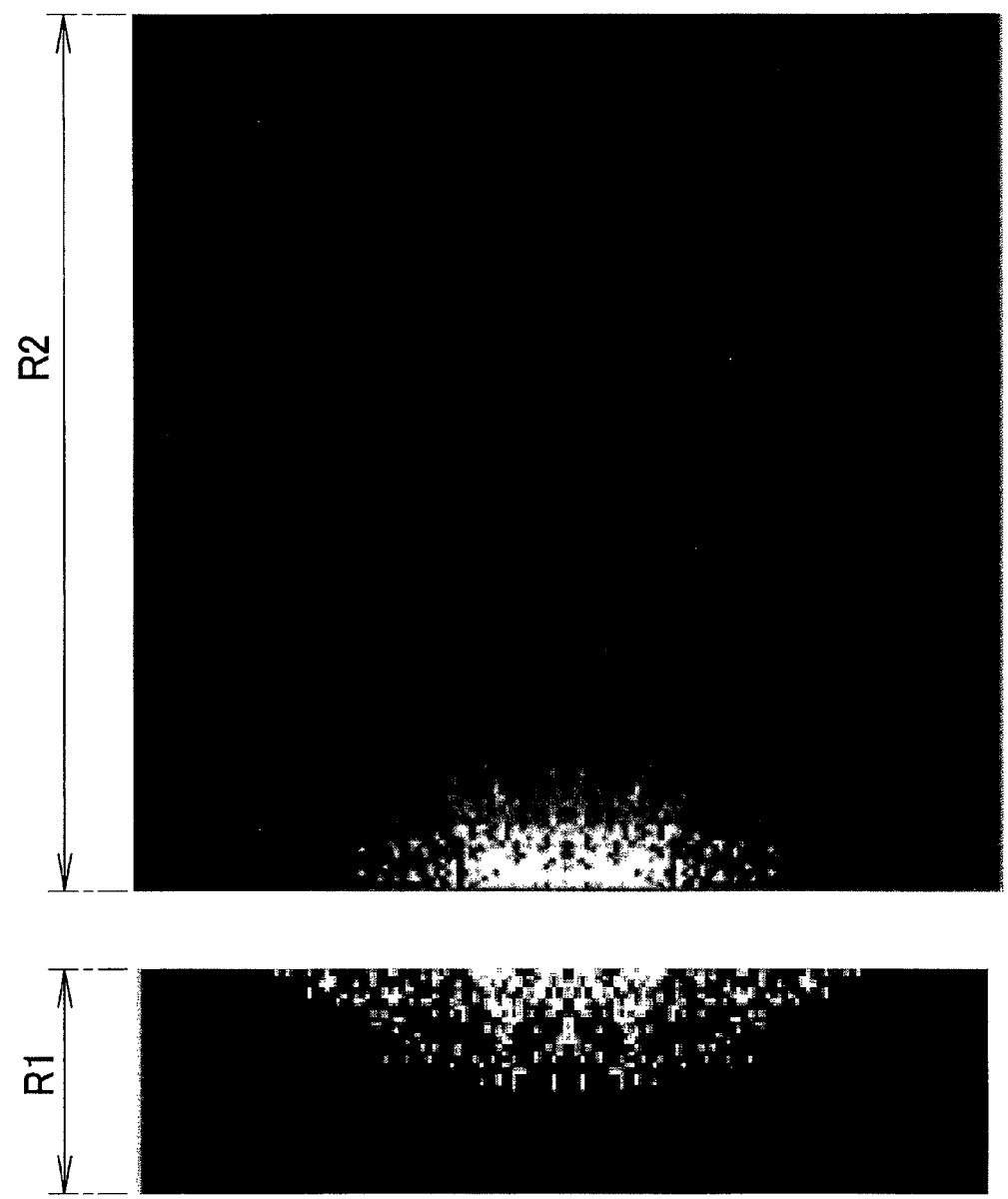
FIG. 2 is a diagram illustrating a distribution of light leaked from the light guide plate.
Figure 3:
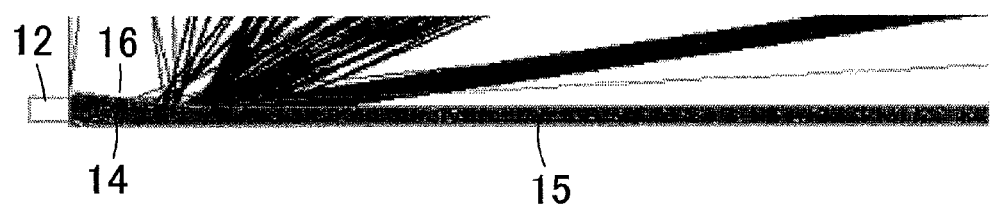
FIG. 3 is a light ray diagram illustrating a state where light is leaked from the light guide plate.
Figure 4:
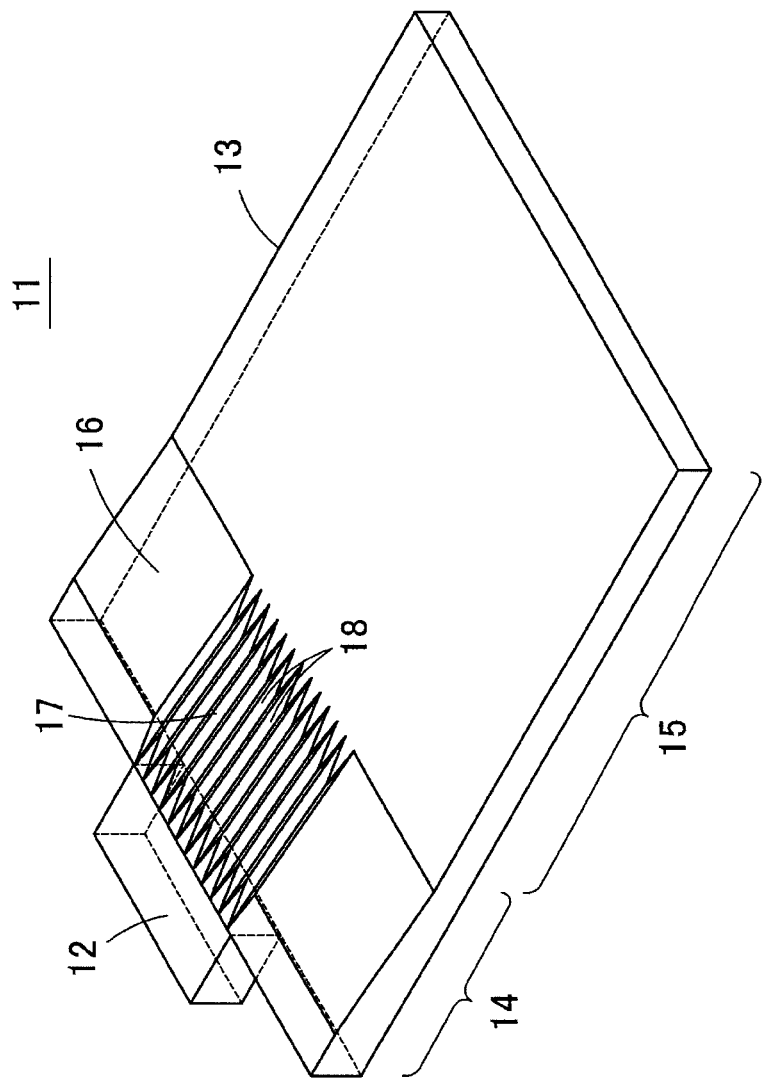
FIG. 4 is a perspective view illustrating the structure of a conventional surface light source device.
Figure 5:
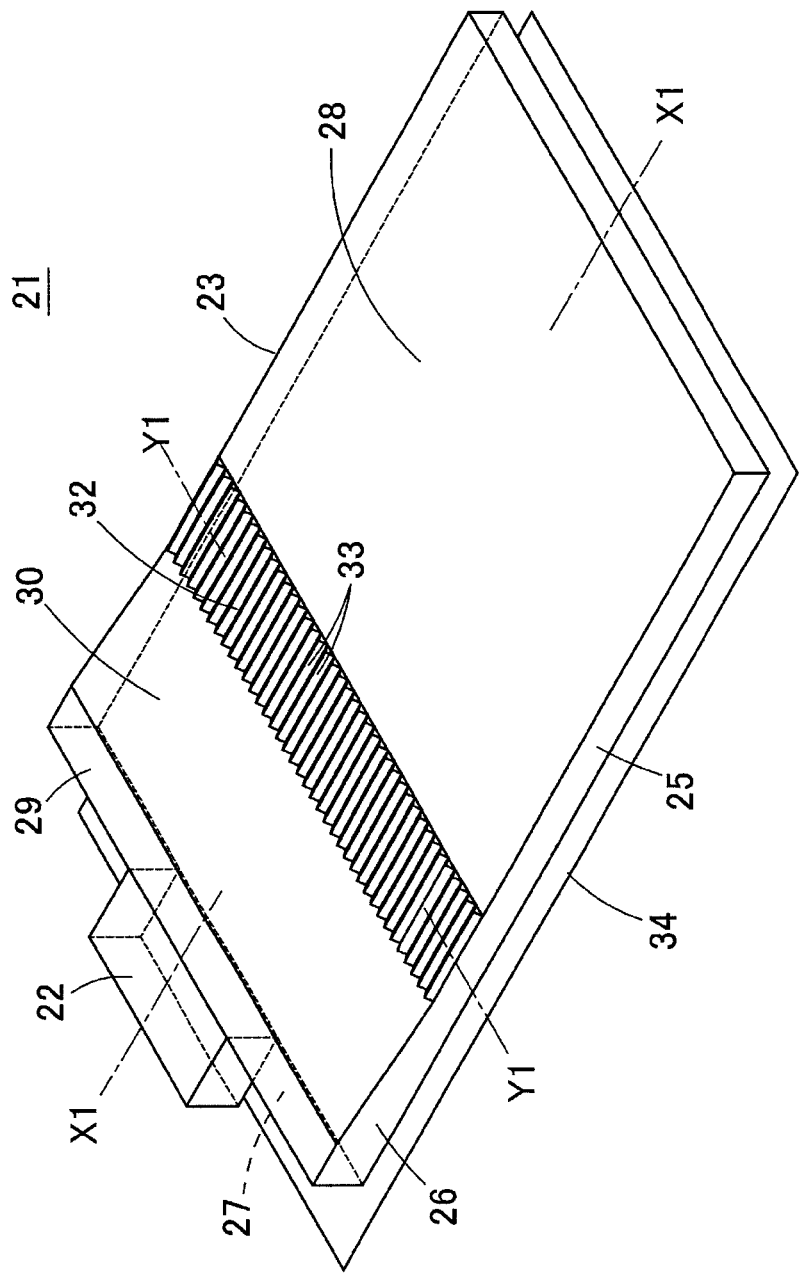
FIG. 5 is a perspective view illustrating a surface light source device according to a first embodiment of the present invention.
Figures 6A, 6B:
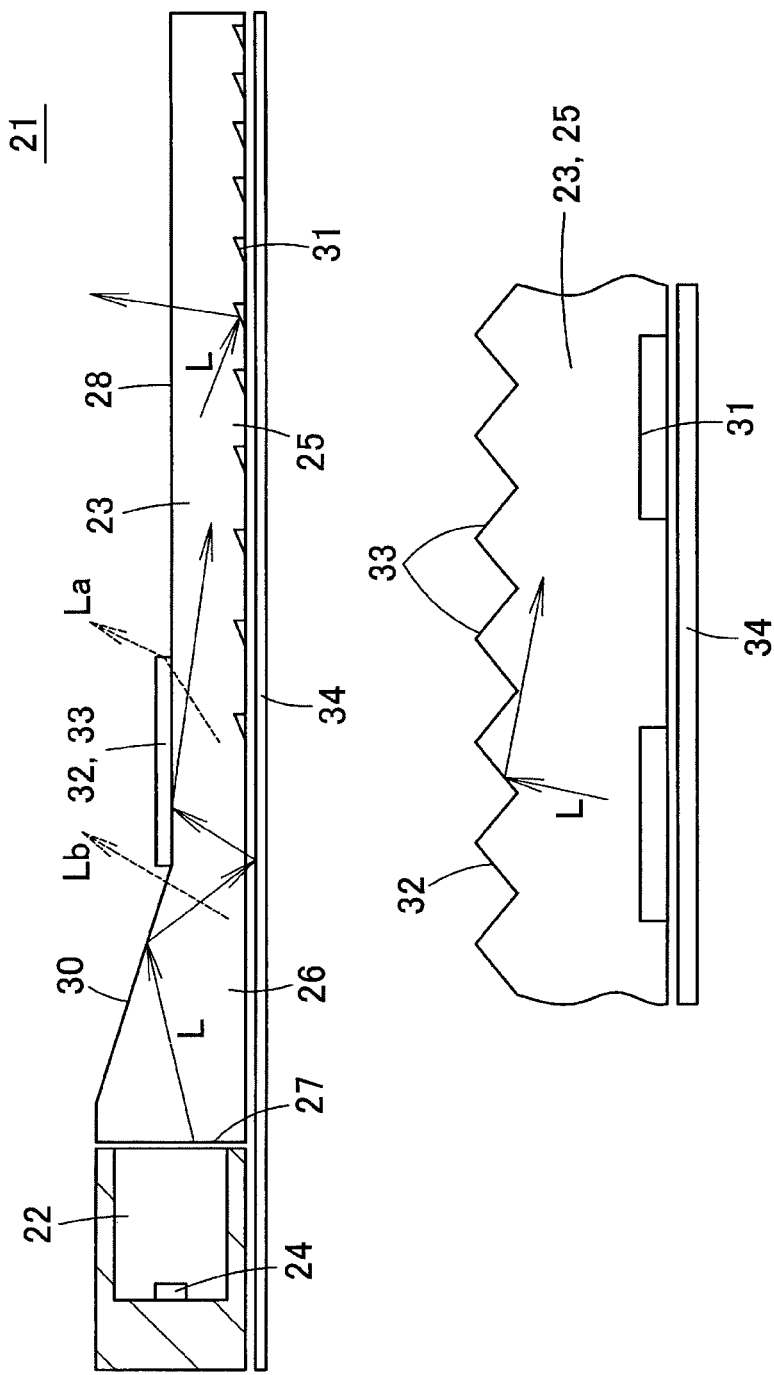
FIG. 6A is a cross section taken along line X1-X1 in FIG. 5.
FIG. 6B is an enlarged cross section illustrating a part of a section taken along line Y1-Y1 in FIG. 5.

With reference to FIG. 5 and FIGS. 6A and 6B, the structure of a surface light source device according to a first embodiment of the present invention will be described. FIG. 5 is a perspective view illustrating a surface light source device 21 according to a first embodiment of the present invention. FIG. 6A is a cross section taken along in the length direction of a light guide plate, that is, the direction X1-X1 in FIG. 5. FIG. 6B is an enlarged cross section illustrating a part of a section taken along the Y1-Y1 direction in FIG. 5.

The surface light source device 21 is made by a light source 22 and a light guide plate 23. The light source 22 includes one or plural LEDs 24 and emits white light from a light exit window at the front. The light source 22 has a width smaller than that of the light guide plate 23 and is sometimes called a point light source whereas a cathode ray tube is called a linear light source.

The light guide plate 23 is obtained by integrally forming a light introduction part 26 at an end of a light guide plate body 25. The light guide plate 23 is formed by a transparent resin having high refractive index such as acrylic resin, polycarbonate resin (PC), cycloolefin-based material, or polymethyl methacrylate (PMMA).

The light introduction part 26 is a thick part in the light guide plate 23. The light source 22 faces the end face of the light introduction part 26, that is, a part of a light incident end face 27. The thickness of the light incident end face 27 is equal to or larger than the height of a light exit window of the light source 22. As a result, light emitted from the light source 22 efficiently enters the light introduction part 26 from the light incident end face 27, and light use efficiency of the surface light source device 21 improves.

The light introduction part 26 has a wedge shape and becomes gradually thinner from the light incident end face side toward the light guide plate body side. That is, in the top face of the light introduction part 26, the end-part region on the side of the light incident end face is a horizontal face 29, and a region from the end of the horizontal face 29 to the end of the light guide plate body 25 is an inclined face 30. The inclined face 30 extends in a band shape from one side face of the light guide plate 23 to the other side face and is inclined from the end of the horizontal face 29 toward the end of the light guide plate body 25. The inclined face 30 is smooth.

The light guide plate body 25 is a flat plate whose surface and rear face are parallel. The thickness of the light guide plate body 25 is almost uniform and is smaller than the maximum thickness of the light introduction part 26. The light guide plate body 25 occupies the area of a major part of the light guide plate 23. The opposite face opposed to a light emitting surface 28 in the light guide plate body 25 has light emitting means 31. In FIGS. 6A and 6B, a number of prism-shaped patterns are shown as the light emitting means 31. The light emitting means 31 may be a pattern obtained by sandblast process or photo-printing diffusion ink, a diffraction grating pattern, or an arbitrary irregular pattern. The light emitting means 31 may be provided on the light emitting surface 28 and/or an opposite face of the light emitting surface 28. The light emitting means 31 may be provided at relatively low density near the light source 22. The density increases as a distance from the light source 22 is far, thereby making the brightness of the light emitting surface 28 uniform.

In the top face of the light guide plate body 25, an optical pattern part, that is, a directivity conversion pattern 32 is provided in a region adjacent to the inclined face 30 of the light introduction part 26. Therefore, the directivity conversion pattern 32 is positioned between the inclined face 30 and the light emitting surface 28. The directivity conversion pattern 32 is made of a plurality of pattern elements 33 having a mountain-shaped projection or a V-groove shape. The pattern elements 33 extend in a direction perpendicular to the light incident end face 27 and are arranged in parallel to one another along the width direction of the light guide plate body 25. The pattern elements 33 have a uniform sectional shape along its length direction. Further, the pattern elements 33 have the same sectional shape. The section perpendicular to the length direction, of the pattern element 33 has a sectional shape which is bilaterally symmetric, that is, an isosceles triangle. The vertex angle in the cross section is about 120°. In one or more embodiments of the present invention, the valley line of each pattern element 33 is positioned at the same height as the light emitting surface 28.

To the under face of the light guide plate 23, a reflection sheet 34 is opposed. The reflection sheet 34 functions to reflect light leaked from the under face of the light guide plate 23 so that the light returns to the inside of the light guide plate 23. The reflection sheet 34 is, for example, a white sheet. Light leaked from the under face of the light guide plate 23 is reflected by the reflection sheet 34 and returns to the inside of the light guide plate 23, so that deterioration in brightness of the surface light source device 21 caused by light leakage from the under face of the light guide plate 23 can be prevented.

The behavior and the effect of light in the surface light source device 21 are as follows. As illustrated in FIG. 6A, light L emitted from the light source 22 enters the light introduction part 26 from the light incident end face 27 and is guided to the light guide plate body 25 while being reflected between the upper face and the lower face of the light introduction part 26. The light L which enters the light guide plate body 25 is guided in the light guide plate body 25 while being reflected by the upper face and the lower face (or the reflection sheet 34) of the light guide plate body 25. The light L incident on the light emitting means 31 while being guided is reflected by the light emitting means 31 and passes through the light emitting surface 28, so that light is emitted uniformly from the light emitting surface 28.

The major part of the light L reflected by the inclined face 30 of the light introduction part 26 is reflected by the lower face of the light introduction part 26 and, after that, is incident on the upper face of the light guide plate body 25 in the proximity of the inclined face 30. However, the incidence angle of the light which is regularly reflected by the inclined face 30 when the light is incident on the lower face of the light guide plate body 25 becomes small, so that a part of the light L is leaked from the lower face of the light guide plate body 25. The light L leaked from the lower face of the light guide plate body 25 is reflected by the reflection sheet 34, enters again the light guide plate 23, and is incident on the upper face of the light guide plate body 25 in the proximity of the inclined face 30.

In the case where the directivity conversion pattern 32 is not provided, the light incident on the upper face of the light guide plate body 25 in the proximity of the inclined face 30 is leaked from the region in the proximity of the inclined face 30 to the outside and the region in the proximity of the inclined face 30 is locally illuminated. On the other hand, in the case where the directivity conversion pattern 32 is provided in the proximity of the inclined face, even if the incidence angle to the upper face of the light guide plate body 25 becomes smaller, the angle of incidence on a slant face of the pattern element 33 is large. Consequently, as illustrated in FIG. 6B, light incident on the upper face of the light guide plate body 25 is reflected by the pattern element 33 more easily. Therefore, regardless of the fact that the inclined face 30 is provided in the light introduction part 26, leakage of light from the region in the proximity of the inclined face 30 is suppressed. As a result, the phenomenon that the top face of the light guide plate body 25 in the proximity of the inclined face locally shines can be prevented.

When light is regularly reflected by the directivity conversion pattern 32, directivity spread in the thickness direction of the light guide plate 23 of the light incident on the light introduction part 26 (that is, directivity spread in the face perpendicular to the light emitting surface 28) is converted to a directivity characteristic which is inclined to a direction parallel to the face direction of the light guide plate 23. As a result, leakage of light from the region in the proximity of the directivity conversion pattern of the light emitting surface 28 is suppressed, and shining of the end of the light emitting surface 28 is suppressed.

The surface light source device 21 is provided with the directivity conversion pattern 32 in the proximity of the inclined face so that light can be scattered to the width direction of the light guide plate body 25. As a result, bias of the amount of light emitted from the light emitting surface 28 is decreased, and the brightness distribution of the light emitting surface 28 can be made uniform.

In the case of providing the directivity conversion pattern for the inclined face like the conventional art, when the directivity conversion pattern is processed in a mold of the light guide plate by a cutting tool or the like, V-groove process has to be performed while making the mold inclined. Since such a work should be carried out, manufacture of the mold is difficult. On the other hand, in the surface light source device 21 of one or more embodiments of the present invention, the directivity conversion pattern 32 is provided on the top face of the light guide plate body 25. In the case of processing the directivity conversion pattern in the mold, it is sufficient to form V grooves in the horizontal face (the top face of the light guide plate body 25). Therefore, according to one or more embodiments of the present invention, the process for the mold can be simplified, and the process cost of the mold can be decreased.

Further, in comparison with the case where the directivity conversion pattern is provided on the inclined face, the position of the directivity conversion pattern 32 becomes far from the light source 22, so that light leakage can be decreased and the light use efficiency improves.

Figure 7A:
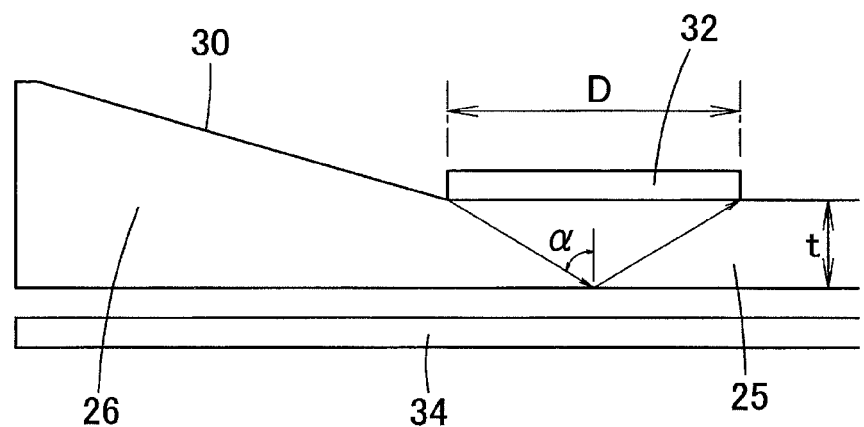
FIG. 7A is a diagram for explaining a method of determining length of a conductivity conversion pattern.

Next, the region in which the directivity conversion pattern 32 is provided will be described. FIG. 7A illustrates a section in the vertical direction of the light introduction part 26 and its neighboring region in the light guide plate 23. To prevent light leakage in the proximity of the inclined face by the directivity conversion pattern 32, the light guided to the light guide plate body 25 has to be reflected by the directivity conversion pattern 32 at least once. A situation that light which is at the border of not being reflected by the directivity conversion pattern 32, specifically, light reflected by the end the light guide plate body 25 (the position where the inclined face finishes) is reflected by the lower face of the light guide plate body 25, and is incident again on the upper face of the light guide plate body 25 will be examined. It is sufficient to provide the directivity conversion pattern 32 in a light incidence region in the upper face of the light guide plate body. Light L which propagates farthest in the light guide plate body 25 is, as illustrated in FIG. 7A, light which is incident on the lower face of the light guide plate body 25 at a critical angle $\alpha = \arcsin(1/n)$ of total reflection. "n" denotes the refractive index of the light guide plate 23. Therefore, when the thickness of the light guide plate body 25 is set to "t", it is sufficient to provide the directivity conversion pattern 32 in a region of at least $2 \times t \times \tan \alpha$ from the end position of the inclined face 30 (the end of the light guide plate body 25).

Consequently, to prevent light leakage by making light incident on the light guide plate body 25 enter the directivity conversion pattern 32 at least once, it is sufficient to set the length of the directivity conversion pattern 32 to D and satisfy the following equation 1.

$$D \geq 2 \times t \times \tan[\arcsin(1/n)] \quad \text{Condition 1}$$

For example, when the refractive index "n" of the light guide plate 23 is set to 1.59 (refractive index of polycarbonate resin) and the thickness "t" of the light guide plate body 25 is set to 0.23 mm, the length D of the directivity conversion pattern 32 is required to be 0.372 mm or more.

When the length D of the directivity conversion pattern 32 increases, there is the possibility that the directivity conversion pattern 32 extends to an effective illumination region (region used as a light emission face for illumination). In this case, the length D of the directivity conversion pattern 32 has to be regulated so that the directivity conversion pattern 32 does not extend to the effective illumination region.

Figure 7B:
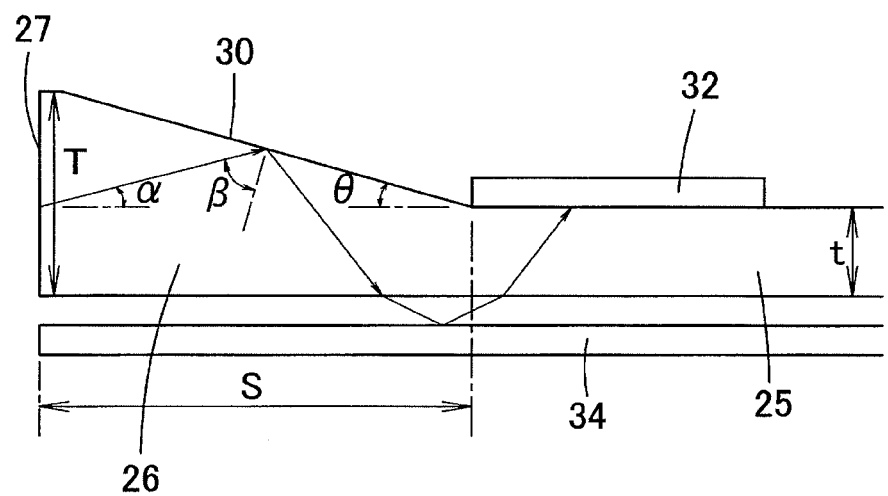
FIG. 7B is a diagram for explaining a method of determining length of an inclined face.

Next, to prevent light leakage from the inclined face 30 to the outside, it is sufficient to satisfy the following conditions 2 and 3. Light incident on the inclined face 30 at the smallest incidence angle in the light incident on the inclined face 30 is light which propagates at an angle equal to the critical angle $\alpha = \arcsin(1/n)$ of total reflection in the direction perpendicular to the light incident end face 27. When the inclination angle of the inclined face 30 is θ, the incidence angle β when light propagating at the angle of α in the horizontal direction is incident on the inclined face 30 is expressed as follows as understood from FIG. 7B.

$$\beta = (\pi/2) - \alpha - \theta$$

To prevent light which is most leakable from the inclined face 30 from being leaked from the inclined face 30, it is sufficient that the incidence angle β is larger than the critical angle $\alpha = \arcsin(1/n)$ of total reflection. Therefore, it is sufficient that the inclination angle θ of the inclined face 30 satisfies the following condition 2.

$$\theta \leq (\pi/2) - 2 \times \arcsin(1/n) \quad \text{Condition 2}$$

After light guided in the light introduction part 26 is reflected some times in the inclined face 30, the light incident on the inclined face 30 leaks from the inclined face 30. Therefore, a condition to set that light is incident on the inclined face 30 once is necessary. Specifically, in addition to the condition 2, length (horizontal distance) S of the inclined face 30 has to satisfy the following condition 3. T denotes maximum thickness of the light introduction part 26, "t" denotes thickness of the light guide plate body 25, "n" indicates refractive index of the light guide plate 23, and θ indicates the inclination angle of the inclined face 30.

$$S \leq (T+t)/\tan[\arcsin(1/n) + 2\theta] \quad \text{Condition 3}$$

Second Embodiment

Figure 8:
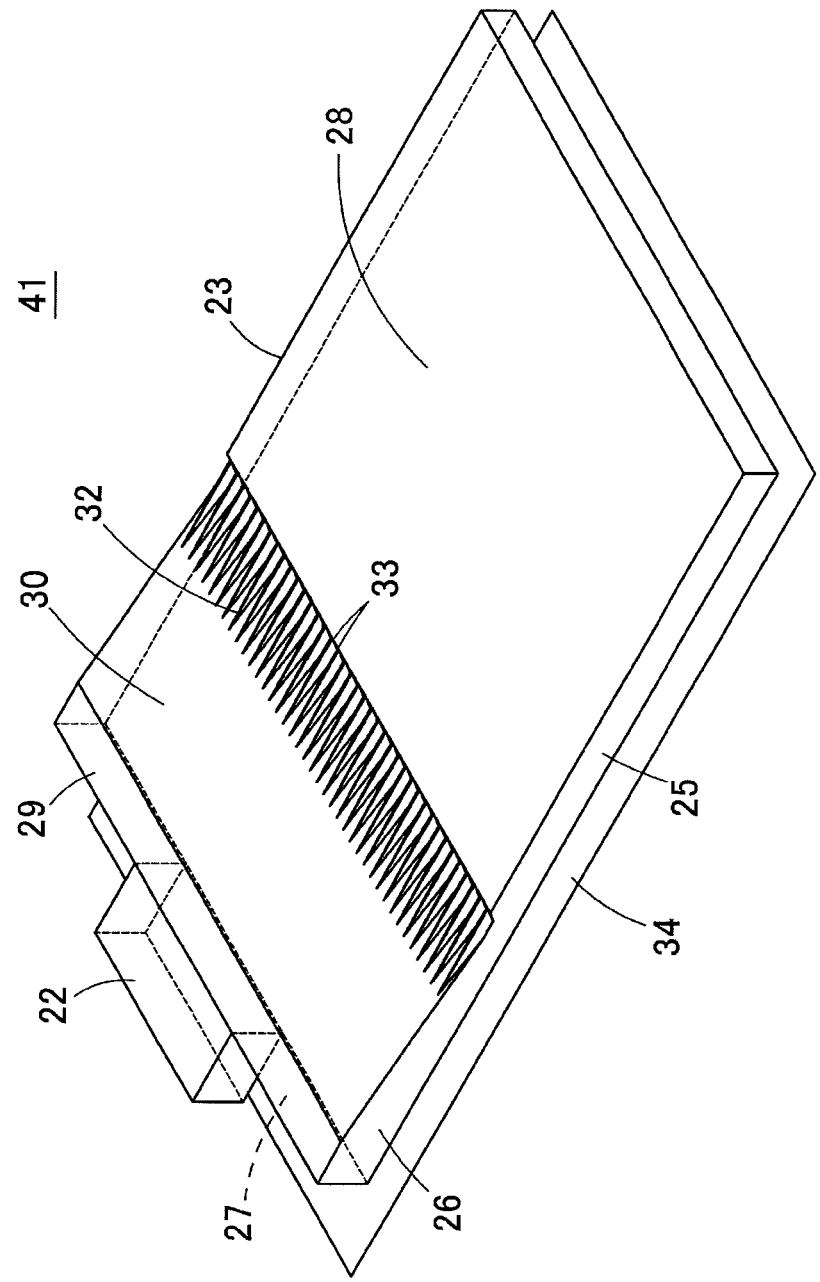
FIG. 8 is a perspective view of a surface light source device according to a second embodiment of the present invention.
Figure 9:
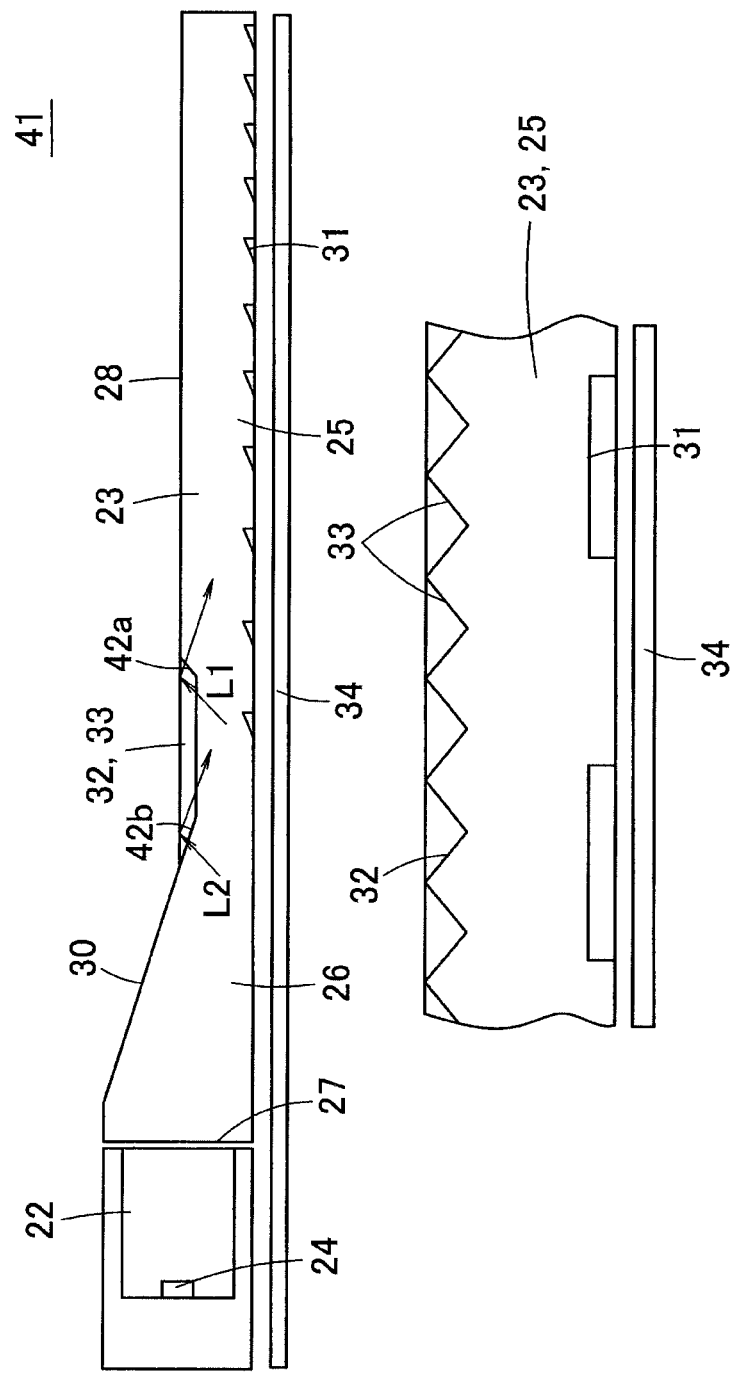
FIG. 9A is a cross section of a surface light source device, along the length direction of a light guide plate.
FIG. 9B is an enlarged cross section illustrating a part of a section taken along the width direction of the light guide plate.

FIG. 8 is a perspective view of a surface light source device 41 according to a second embodiment of the present invention. FIG. 9A is a cross section of the surface light source device 41, along the length direction of a light guide plate. FIG. 9B is an enlarged cross section illustrating a part of a section taken along the width direction of the light guide plate. In the surface light source device 41 of the second embodiment, at least part of the valley line of the directivity conversion pattern 32 is positioned on the center side of the light guide plate body 25, that is, lower than the surface of the light guide plate body 25 (light emitting surface 28). Since the other structure is almost the same as that of the first embodiment, the same reference numerals are designated to the same components and the description in the first embodiment is to be used (also in third and subsequent embodiments).

The directivity conversion pattern 32 is obtained by arranging the plurality of pattern elements 33 each having a mountain or groove shape in parallel to each other as illustrated in FIGS. 8 and 9B. The directivity conversion pattern 32 is formed in the recessed part in the light emitting surface 28 and the valley line (the very small part in the pattern element 33) is positioned below the light emitting surface 28. In the example illustrated in the diagram, the ridge line of the directivity conversion pattern 32 (the very large part in the pattern element 33) is positioned at the same height as that of the light emitting surface 28 and the entire directivity conversion pattern 32 is buried below the light emitting surface 28. However, the ridge line of the directivity conversion pattern 32 may be positioned below the light emitting surface 28.

In the case where the directivity conversion pattern 32 is protruded to above the light emitting surface 28 as in the first embodiment, a part of the light entering the light guide plate body 25 from the light introduction part 26 is easily leaked from the end face on the light emitting surface side of the pattern element 33 like light La illustrated in FIG. 6A. As a result, there is the possibility that light emission like an eye shape occurs at the end of the light emitting surface 28 and brightness becomes locally high. There is also the possibility that light use efficiency decreases due to light leakage.

On the other hand, in the case where the directivity conversion pattern 32 lies below the light emitting surface 28, an end face 42a on the light emitting surface side of the directivity conversion pattern 32 is not exposed from the light guide plate body 25. Consequently, the light L1 passed through the end face 42a on the light emitting surface side enters below the light emitting surface 28 and is not easily leaked to the outside of the light guide plate 23. As a result, light emission like an eye shape which occurs at the end of the light emitting surface 28 is reduced, so that a nonuniform brightness distribution can be prevented. Since the leakage light decreases, the light use efficiency improves.

The end face 42a on the light emitting surface side of the directivity conversion pattern 32 (or a wall face of a dent positioned between the end faces of neighboring pattern elements 33) is desirably inclined upward toward the light emitting surface 28 for convenience of detaching a molded piece of the light guide plate. The end face 42a, however, is not limited to such an inclined face. For example, the end face 42a on the light emitting surface side of the directivity conversion pattern 32 may be a face perpendicular to the light emitting surface 28.

According to one or more embodiments of the present invention, as illustrated in FIG. 9A, an end face 42b on the light introduction part side of the directivity conversion pattern 32 (pattern element 33) is connected to the inclined face 30 so as to penetrate through the inclined face 30 of the light introduction part 26. When there is a gap between the end face on the light introduction part side of the directivity conversion pattern 32 and the inclined face 30 as illustrated in FIG. 6A, light leakage occurs from a part opposed to the end face on the light introduction part side of the directivity conversion pattern 32 in the inclined face 30 to the gap like light Lb illustrated by the broken line in FIG. 6A. Consequently, light use efficiency decreases, and light emission like an eye shape occurs at the lower end of the inclined face 30.

On the other hand, in one or more embodiments of the present invention, the end face 42b on the light introduction part side of the directivity conversion pattern 32 is connected so as to penetrate through the inclined face 30. In this case, light passed through the end face 42b on the light introduction part side of the directivity conversion pattern 32 is reflected by the directivity conversion pattern 32 and returns to the inside of the light guide plate body 25 like the light L2 illustrated in FIG. 9A. Therefore, when the end face 42b on the light introduction part side of the directivity conversion pattern 32 is connected so as to penetrate the inclined face, the light use efficiency improves, and light emission like an eye shape in the proximity of the end face 42b on the light introduction part side can be reduced.

A part of the directivity conversion pattern 32 may be protruded to above the light emitting surface 28 and a part may lie below the light emitting surface 28. For example, the upper half in the height of the pattern element 33 may be protruded to above the light emitting surface 28 and the lower half may lie below the light emitting surface 28.

Third Embodiment

Figure 10:
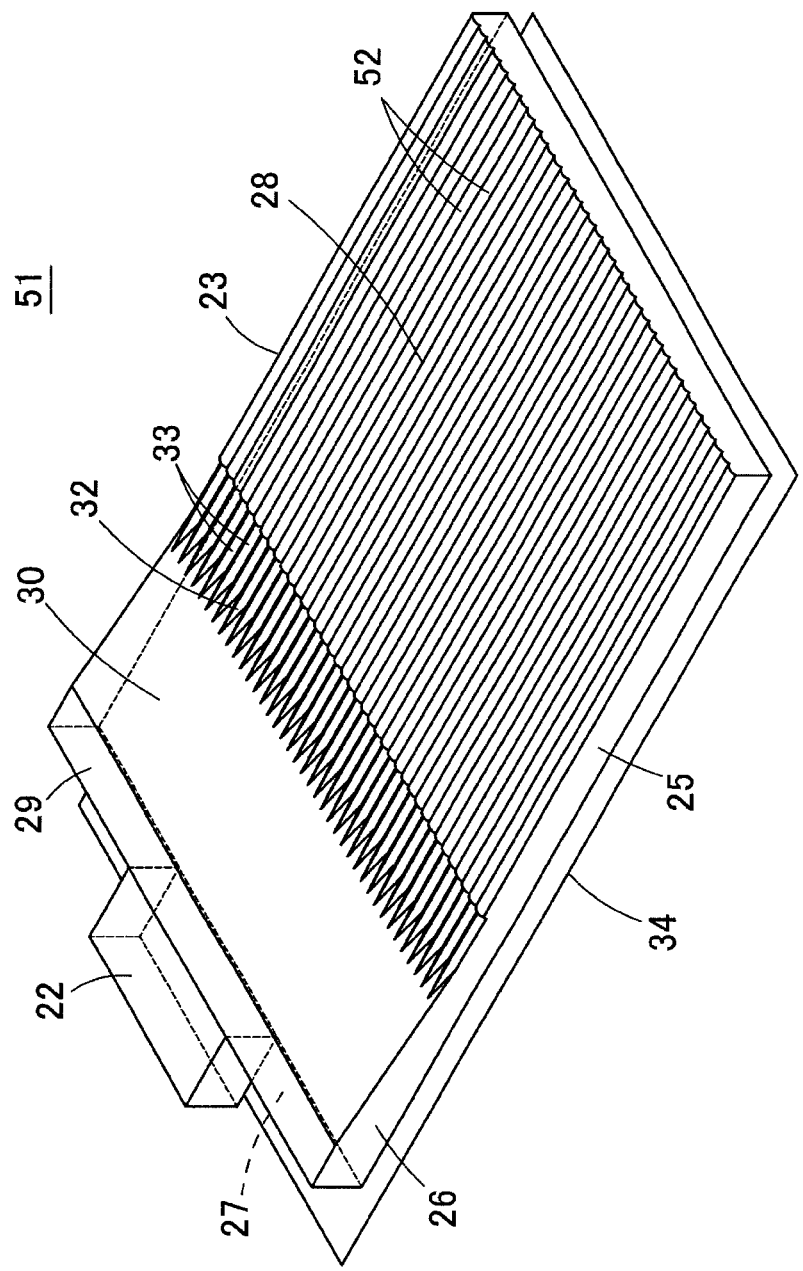
FIG. 10 is a perspective view of a surface light source device according to a third embodiment of the present invention.

FIG. 10 is a perspective view of a surface light source device 51 according to a third embodiment of the present invention. In the third embodiment, the light emitting surface 28 has a fine lenticular lens 52. The lenticular lens 52 extends in a direction perpendicular to the light incident end face 27 and its lenses are arranged along the width direction of the light guide plate body 25. By providing the lenticular lens 52 for the light emitting surface 28, the directivity characteristic of light emitted from the light emitting surface 28 is narrowed in the width direction of the light guide plate 23.

In a certain sample of the surface light source device 51 of the third embodiment, the light use efficiency (the ratio of light emitted from the light emitting surface in light incident on the light guide plate from the light incident end face) is 93.7%. On the other hand, in a sample of a comparative example that a region in which the directivity conversion pattern 32 is formed in the surface light source device 51 is a flat face, the light use efficiency is 86.6%. Therefore, it could be recognized that by providing the directivity conversion pattern 32 in the surface of the light guide plate body 25, leakage of light can be reduced.

Fourth Embodiment

Figure 11:
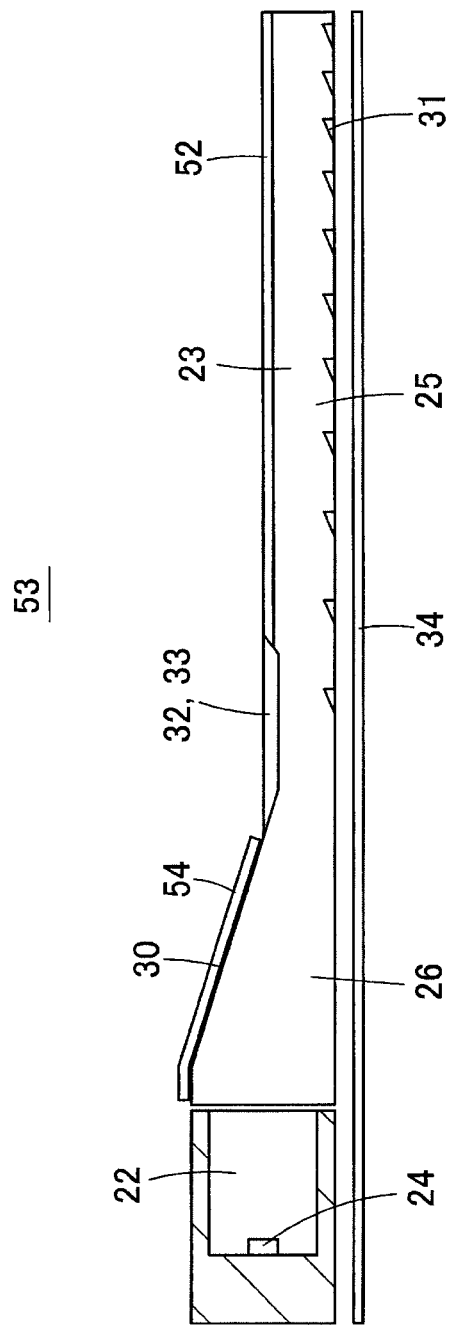
FIG. 11 is a cross section of a surface light source device according to a fourth embodiment of the present invention.

FIG. 11 is a cross section of a surface light source device 53 according to a fourth embodiment of the present invention. In the fourth embodiment, a reflector 54 is disposed on the top face of the light introduction part 26. When the reflector 54 is overlaid on the top face of the light introduction part 26, light leaked from the inclined face 30 is reflected by the reflector 54 and re-enters the inside of the light introduction part 26. Therefore, the amount of light leaked from the inclined face 30 can be reduced, and the light use efficiency of the surface light source device 53 can be improved. Particularly, in the case where the condition 2 or 3 is not satisfied, there is the possibility that light is leaked from the inclined face 30, so that the fourth embodiment is effective.

For example, in a certain model of the fourth embodiment, the light use efficiency was 94.2%. When the reflector 54 was removed, the light use efficiency decreased to 93.7%.

Fifth Embodiment

Figure 12:
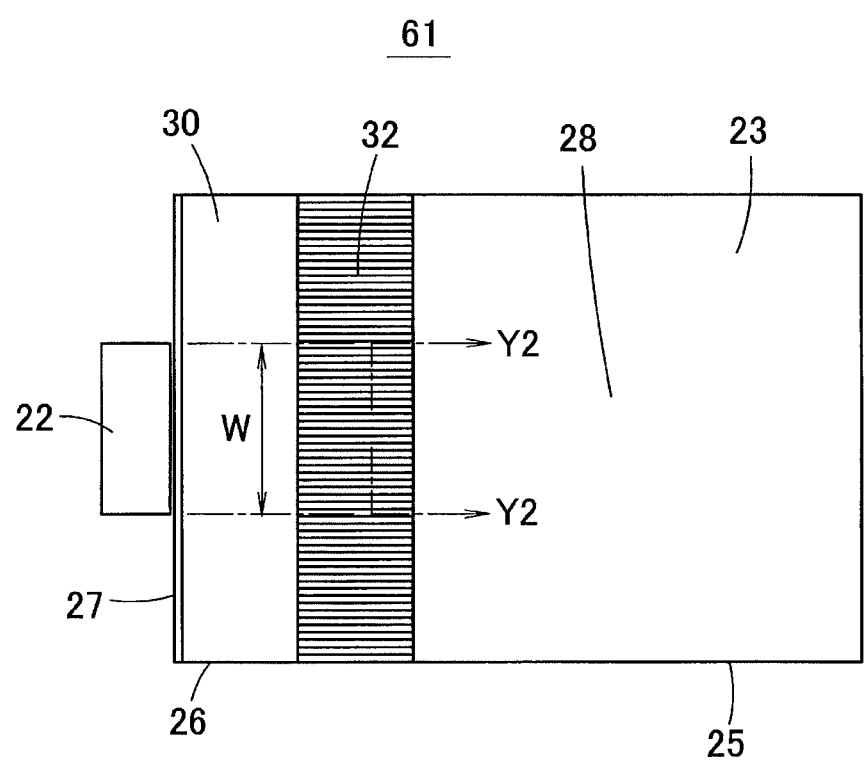
FIG. 12 is a plan view of a surface light source device according to a fifth embodiment of the present invention.

FIG. 12 is a plan view of a surface light source device 61 according to a fifth embodiment of the present invention. The surface light source device 61 of the fifth embodiment has a characteristic in the sectional shape of the directivity conversion pattern 32 formed between the inclined face 30 and the light emitting surface 28. That is, in a section parallel to the light incident end face 27, each of the pattern elements 33 has a shape which is bilaterally asymmetrical.

Figure 13:
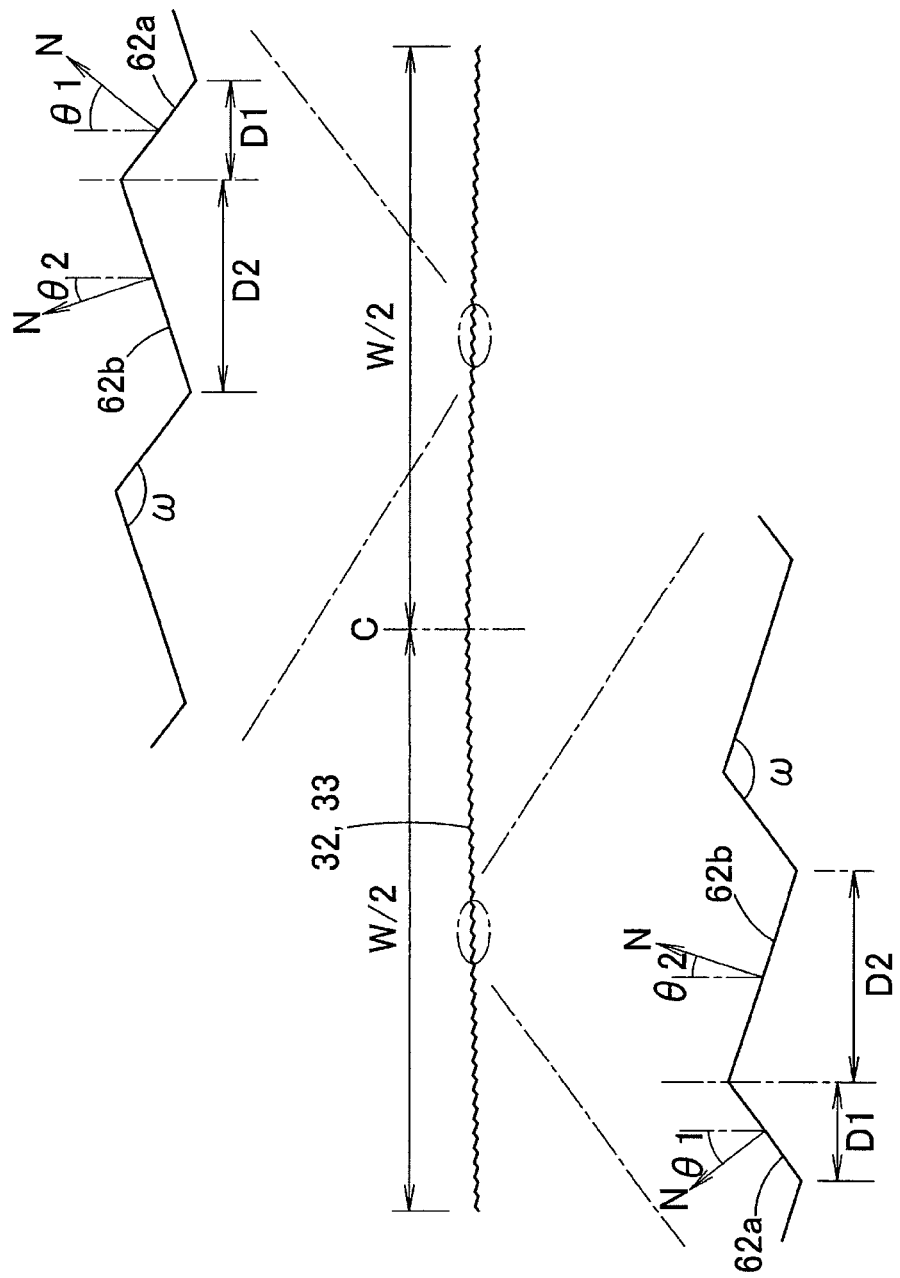
FIG. 13 is a cross section taken along line Y2-Y2 of FIG. 12, parts of which are enlargedly illustrated.

FIG. 13 illustrates a sectional shape of the directivity conversion pattern 32 in a section taken along line Y2-Y2 of FIG. 12. Specifically, FIG. 13 illustrates a part in a region positioned in front of the light source 22 and having a width equal to that of the light source 22 (light source width W) (that is, regions each having W/2 on both right and left sides of a light source center C) in the section of the directivity conversion pattern 32 cut in parallel to the light incident end face 27. The light source center C is a plane passing through the light emission center of the light source 22 and parallel to the light incident end face 27 and the light emitting surface 28 in the light guide plate 23. The light source width W is not the width of the package of the light source 22 but is the width of the light emission face (light exit window). Although the directivity conversion pattern 32 has a shape which is bilaterally symmetric with respect to the light source center C in FIG. 13, it does not always have to be bilaterally symmetric.

The directivity conversion pattern 32 of the surface light source device 61 of the fifth embodiment has the following structure or characteristic in a region having the light source width W in the section parallel to the light incident end face 27. Although a region on the outside of the light source width W may have a structure or characteristic similar to that of a region having the light source width W, the amount of light is small in a region apart from the light source 22. Consequently, the structure of the directivity conversion pattern 32 is not limited on the outside of the light source width W.

In the region having the light source width W in the section parallel to the light incident end face 27, majority or all of the pattern elements 33 constructing the directivity conversion pattern 32 have an asymmetric shape.

Specifically, a pattern slant face 62a connecting a ridge line (maximum point in the section) and one of valley lines (minimum point in the section) adjacent to the ridge line and a pattern slant face 62b connecting the ridge line and the other valley line (minimum point in the section) adjacent to the ridge line are bilaterally asymmetric with respect to a straight line passing through the ridge line and perpendicular to the light emitting surface 28. A part of the pattern elements 33 (for example, the pattern elements in the position of the light source center C) may be bilaterally symmetrical. The pattern slant faces 62a and 62b are surfaces of the directivity conversion pattern 32 positioned between the ridge and the valley lines adjacent. In the directivity conversion pattern 32 illustrated in FIG. 13, the pattern slant faces 62a and 62b are flat faces. They may be curved faces or bent faces.

The light source center C and a region of W/2 on the left side of the light source center C (hereinbelow, called a left-side region of the light source center C) will be described. When a normal N is set to each of the pattern slant faces 62a and 62b from the inside of the light guide plate 23 toward the outside, the sum of breadths D2 in the pattern slant faces 62b in which the normal N is inclined toward the light source center side (total value in the left-side region of the width W/2, of the breadth D2 of the pattern slant faces 62b) is larger than the sum of the breadths D1 in the pattern slant faces 62a in which the normal N is inclined toward the side opposite to the light source center (total value in the left-side region of the width W/2, of the breadth D1 of the pattern slant faces 62a) (condition 4).

Similarly, the light source center C and a region of W/2 on the right side of the light source center C (hereinbelow, called a right-side region of the light source center C) will be described. When a normal N is set to each of the pattern slant faces 62a and 62b from the inside of the light guide plate 23 toward the outside, the sum of breadths D2 in the pattern slant faces 62b in which the normal N is inclined toward the light source center side (total value in the right-side region of the width W/2, of the breadth D2 of the pattern slant faces 62b) is larger than the sum of the breadths D1 in the pattern slant faces 62a in which the normal N is inclined toward the side opposite to the light source center (total value in the right-side region of the width W/2, of the breadth D1 of the pattern slant faces 62a) (condition 4).

It is consequently sufficient that in the adjacent pattern slant faces 62a and 62b (pattern element), the breadth D2 of the pattern slant face 62b in which the normal N is inclined to the light source center side is larger than or partly equal to the breadth D1 of the pattern slant face 62a in which the normal N is inclined to the side opposite to the light source center (D2≥D1 and NOT (D2≡D1): condition 5). It is sufficient that at least a part of the pattern elements 33 in the region of the light source width W satisfies the condition 5. According to one or more embodiments of the present invention, the larger the number of the pattern elements 33 satisfies the condition 5, the more preferable. However, all of the pattern elements 33 are not always requested to satisfy the condition 5.

Figure 14A:
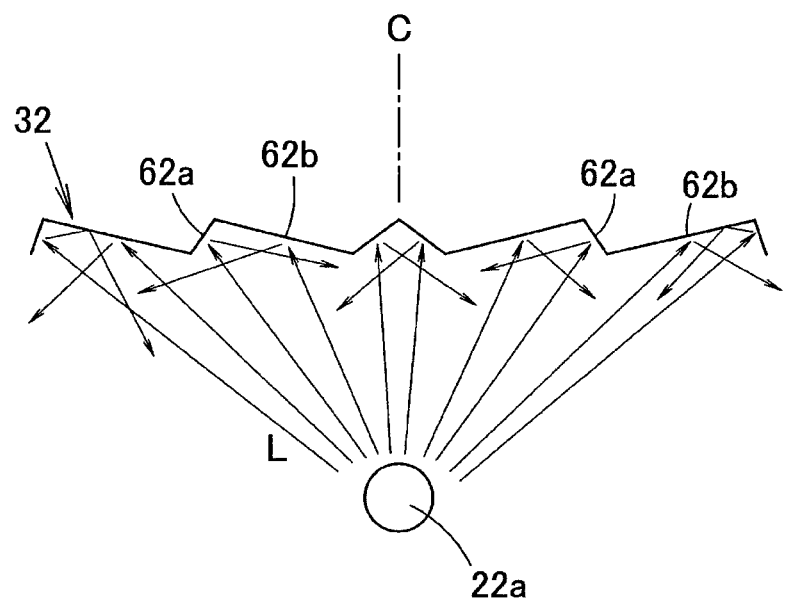
FIG. 14A is a diagram for explaining operation of a directivity conversion pattern illustrated in FIG. 13.
Figure 14B:
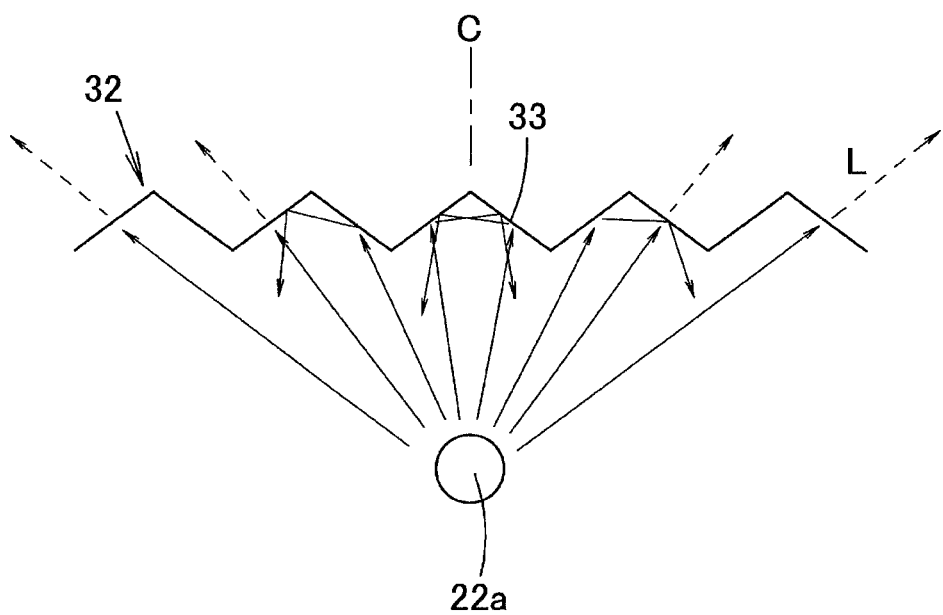
FIG. 14B is a schematic diagram illustrating a state where light is leaked from the directivity conversion pattern in the first embodiment.

FIG. 14B is a schematic diagram illustrating the behavior of light emitted from the light emission center 22a in the directivity conversion pattern 32 made by the pattern elements 33 having a bilaterally symmetrical sectional shape. Since light emitted forward from the light emission center 22a in the light emitted from the light emission center 22a is reflected by the directivity conversion pattern 32, the light is not easily leaked from the slant face of the pattern element 33. However, in the case where the pattern element 33 has a bilaterally symmetrical sectional shape, light emitted obliquely from the light emission center 22a is easily leaked from the slant face of the pattern element 33 to the outside like light L indicated by the broken lines in FIG. 14B. That is, as the position of incidence in the directivity conversion pattern 32 is far from the light source center C, light is incident on the surface of the directivity conversion pattern 32 at an angle closer to the vertical line. As a result, light is easily leaked from the directivity conversion pattern 32, and a light loss increases.

On the other hand, in the fifth embodiment, in each of the right and left regions of the light source center C, the sum of breadths D2 in the pattern slant faces 62b in which the normal N is inclined toward the light source center side is larger than the sum of the breadths D1 in the pattern slant faces 62a in which the normal N is inclined toward the side opposite to the light source center (condition 4). Particularly, in many pattern elements, the breadth D2 of the pattern slant face 62b in which the normal N is inclined to the light source center side is larger than or partly equal to the breadth D1 of the pattern slant face 62a in which the normal N is inclined to the side opposite to the light source center (D2≥D1 and NOT (D2≡D1): condition 5).

Therefore, as illustrated in FIG. 14A, the area of the pattern slant face 62a on which the light L1 emitted in an oblique direction from the light emission center 22a is incident at an angle close to the vertical angle becomes smaller than that in the case of the directivity conversion pattern (FIG. 14B) where the pattern element is bilaterally symmetrical. As a result, light leakage from the pattern slant face 62a is suppressed. Further, the inclination angle of the pattern slant face 62a in which the normal N is inclined to the side opposite to the light source center C increases. Consequently, as compared with the case where the pattern element of the directivity conversion pattern is bilaterally symmetrical, the incidence angle of the light L1 incident on the pattern slant face 62a becomes larger. Therefore, leakage of the light L1 from the pattern slant face 62a is suppressed. As a result, in the surface light source device 61 of the fifth embodiment, leakage of light from the directivity conversion pattern 32 can be suppressed, and light use efficiency improves.

Modification of Fifth Embodiment

In the directivity conversion pattern 32 illustrated in FIG. 13, the pattern elements having the same sectional shape are repeatedly disposed in the regions on the right and left sides of the light source center C. The sectional shape of the pattern elements may change according to distance from the light source center C.

The pattern slant faces 62a and 62b of the directivity conversion pattern 32 do not always have to be flat faces but may be curved faces or bent faces.

According to one or more embodiments of the present invention, the vertex angle ω of the pattern element 33 illustrated in FIG. 13 is constant in the pattern elements 33 for the following reason. When the vertex angle ω is constant, a process of a mold for forming the directivity conversion pattern 32 is easier.

The directivity conversion pattern having a sectional shape as in the fifth embodiment is specifically written in International Application PCT/JP2012/56182. To the surface light source device 61 of the fifth embodiment, various variations described in the International Application can be applied.

Sixth Embodiment

In some of the embodiments described above, the pattern elements 33 are disposed parallel to each other. However, the pattern elements 33 may be inclined to the direction perpendicular to the light incident end face 27.

Figure 15A:
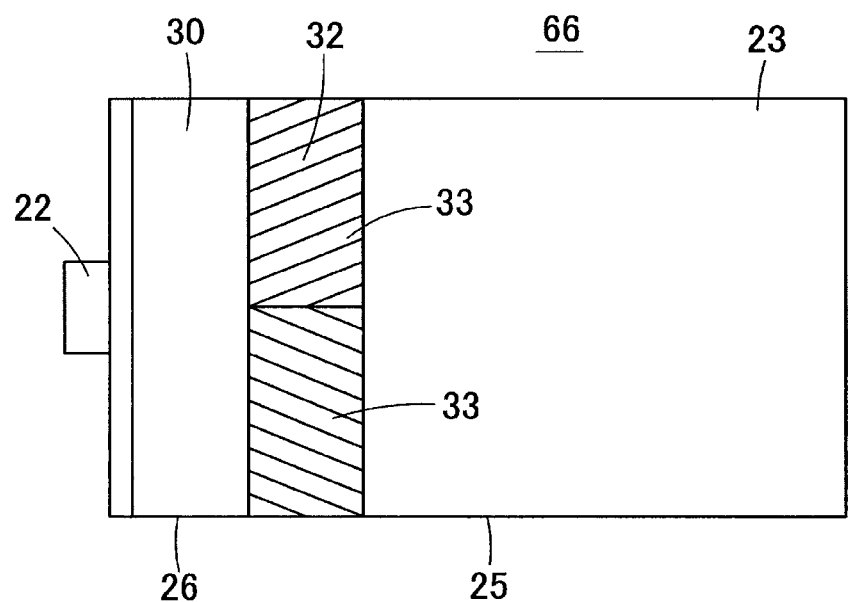
FIGS. 15A and 15B are schematic plan views each illustrating a surface light source device according to a sixth embodiment of the present invention.
Figure 15B:
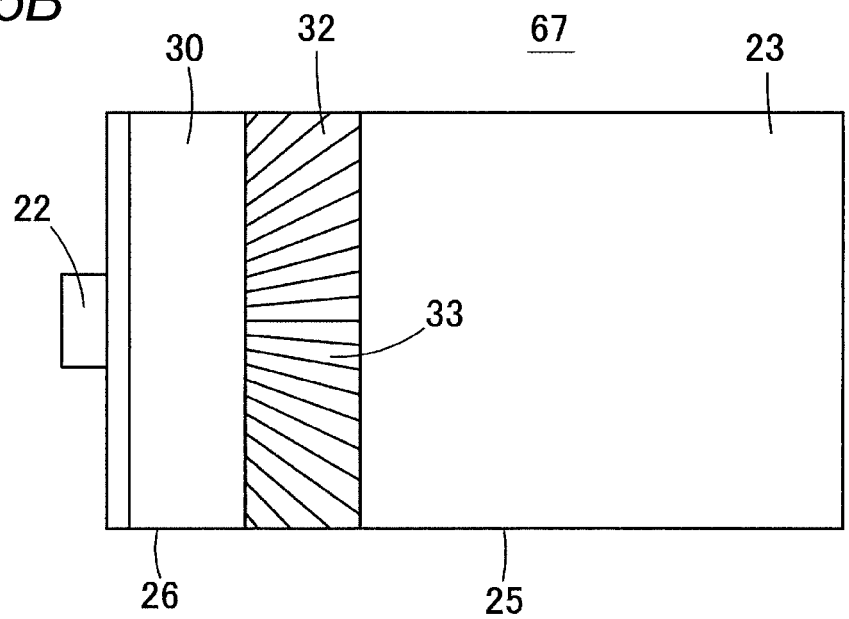

In a surface light source device 66 illustrated in FIG. 15A, the pattern elements 33 are inclined opposite to each other on the right and left sides of the light source center, so that the pattern elements 33 are disposed in a V shape. In the surface light source device 67 illustrated in FIG. 15B, the pattern elements 33 are disposed radially in the proximity of the light source center or a point near the light source center as a center.

As variations of one or more embodiments of the present invention, as illustrated in FIG. 81 of JP 5003758 B, a corner part of a light guide plate is cut to form a light incident end face and a light source may be disposed so as to be opposed to the corner part of the light guide plate. A linear light source as illustrated in FIG. 82 of JP 5003758 B may be used.

Seventh Embodiment

Figure 16:
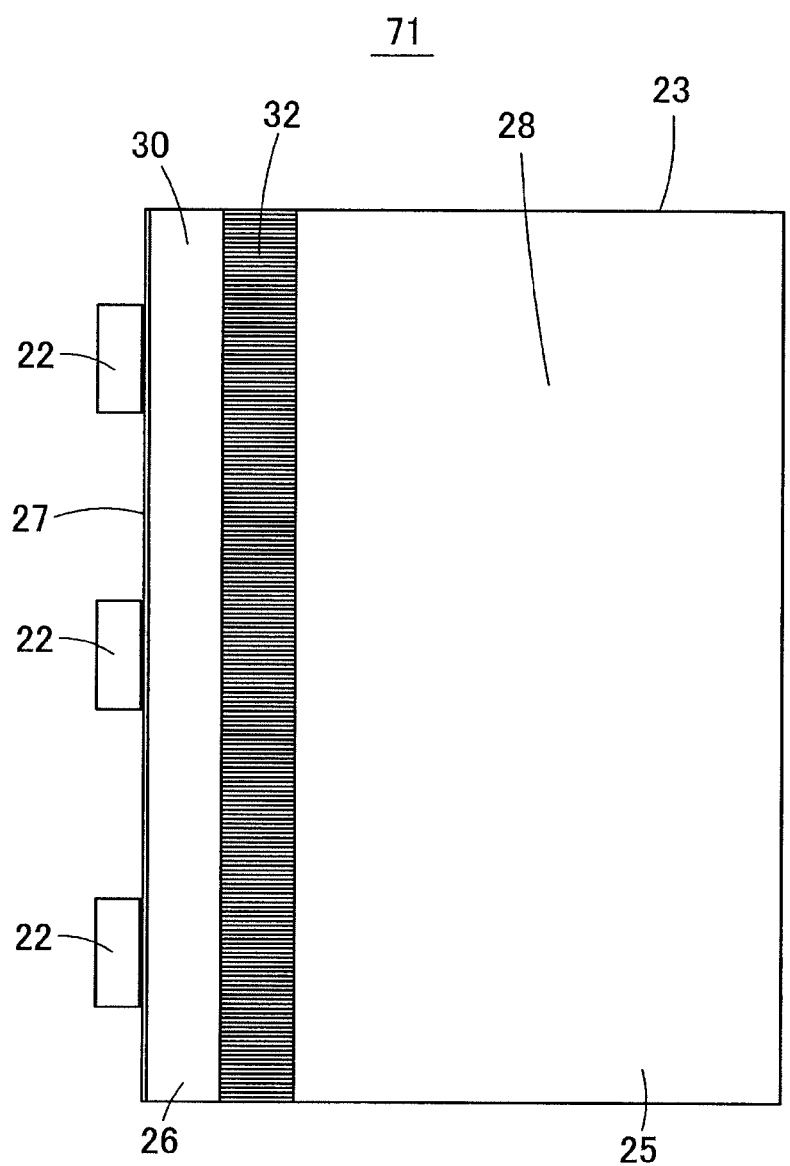
FIG. 16 is a plan view of a surface light source device according to a seventh embodiment of the present invention.

FIG. 16 is a plan view illustrating a surface light source device 71 according to a seventh embodiment of the present invention. In the surface light source device 71, a plurality of light sources 22 are used for a single light guide plate 23. Specifically, a plurality of light sources 22 are disposed at constant pitch so as to face the light incident end face 27 of the light guide plate 23. In a region adjacent to the inclined face 30 of the light guide plate body 25, the directivity conversion pattern 32 is formed. According to the seventh embodiment, a surface light source device having an illumination region of large area can be manufactured. The light guide plate structure as a base of the surface light source device 71 may be the light guide plate in any of the embodiments.

Eight Embodiment

Figure 17:
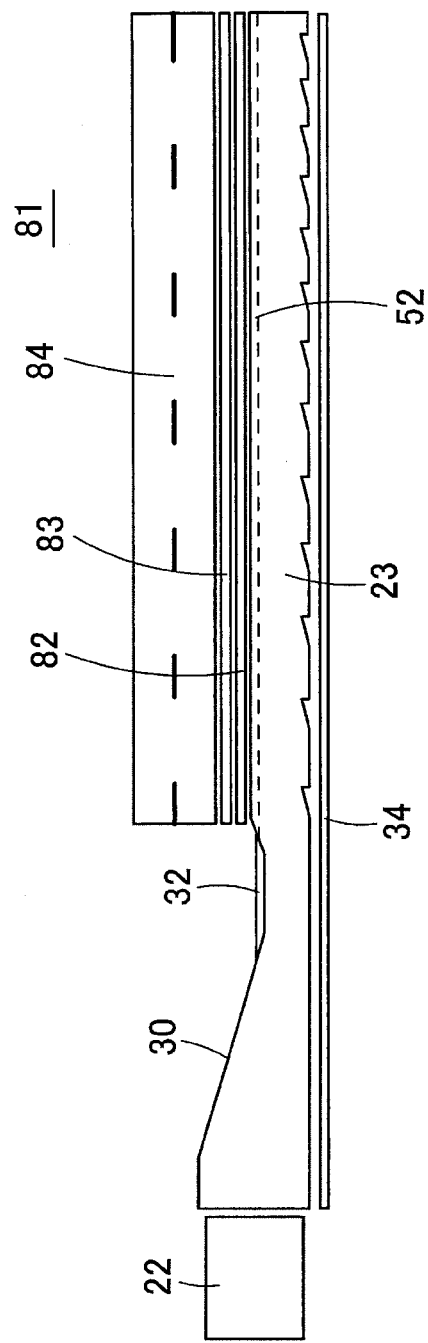
FIG. 17 is a schematic cross section of a liquid crystal display device according to one or more embodiments of the invention.

FIG. 17 is a schematic cross section of a liquid crystal display device 81 using a surface light source device according to one or more embodiments of the present invention (for example, the surface light source device 21 of the first embodiment). In the liquid crystal display device 81, a diffusion plate 82, one or two prism sheets 83, and a liquid crystal panel 84 are overlaid so as to face the light emitting surface of the light guide plate 23, and the reflection sheet 34 is opposed to the under face of the light guide plate 23. In such a liquid crystal display device 81, the characteristic of the surface light source device according to one or more embodiments of the present invention can be utilized, the light use efficiency of the liquid crystal display device 81 is improved so that the screen is easily seen, and the thickness of the liquid crystal display device 81 can be reduced.

Ninth Embodiment

Figure 18:
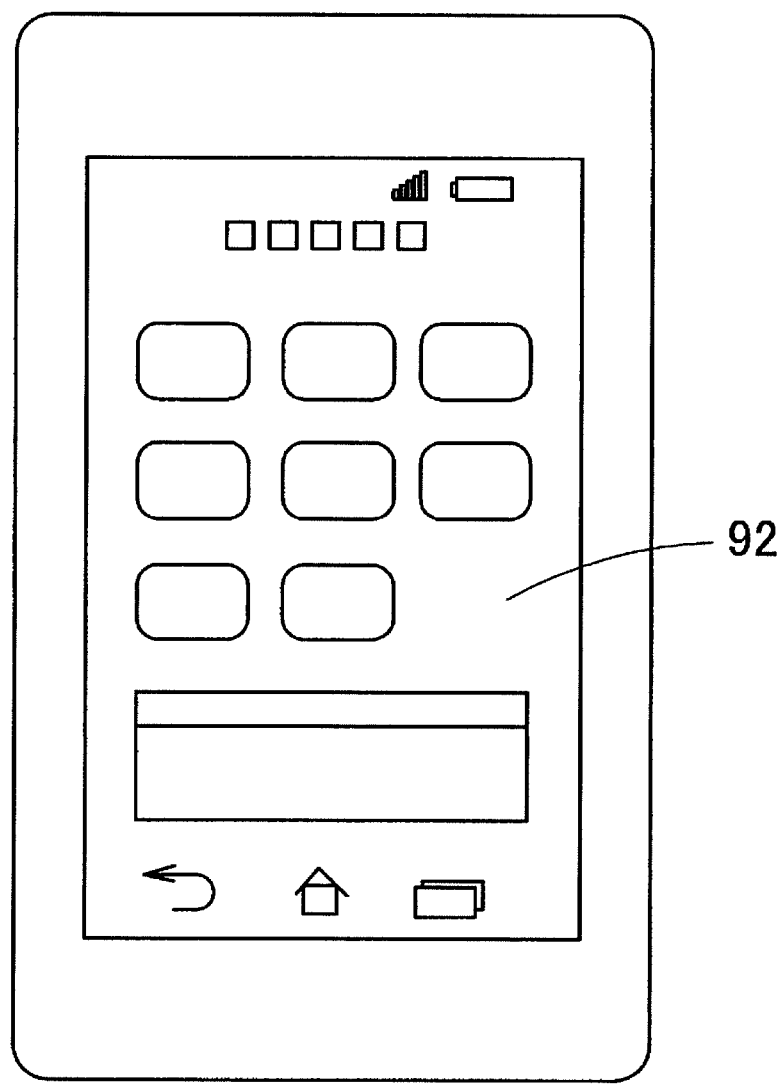
FIG. 18 is a schematic front view of a mobile device according to one or more embodiments of the invention.

FIG. 18 is a plan view of a mobile device using the surface light source device or the liquid crystal display device according to one or more embodiments of the present invention, that is, a smartphone 91. The smartphone 91 has, in its front face, a liquid crystal display device 92 with a touch panel. When the surface light source device according to one or more embodiments of the present invention is used for such a smartphone 91, occurrence of light emission of an eye shape or bright line is suppressed, so that the quality level of the display screen improves. The surface light source device according to one or more embodiments of the present invention can be also applied to a mobile device other than a smartphone, for example, a tablet computer, an electronic dictionary, and an electronic book reader.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
   a light introduction part comprising an end face configured to have light incident thereon; and
   a light guide plate body disposed continuously to the light introduction part and comprising a thickness smaller than a maximum thickness of the light introduction part,
   wherein the light guide plate body comprises a light emitting surface that emits the light incident from the end face,
   wherein the light introduction part comprises an inclined face disposed on at least one side of the light guide plate,
   wherein the inclined face is inclined smoothly from a surface of a part thicker than the light guide plate body toward an end of the light guide plate body,
   wherein an optical pattern part comprising a linear pattern element is disposed near a region in a proximity of the inclined face in a face on a light exit side of the light guide plate body,
   wherein at least a part of a valley line in the optical pattern part is located on the inner side of the light guide plate body more than the light emitting surface, and
   wherein at least a part of a ridge line in the optical pattern part is located on the center side of the light guide plate body more than the light emitting surface.

2. The light guide plate according to claim 1, wherein the linear pattern element has a wedge projection shape or a groove projection shape.

3. The light guide plate according to claim 1, wherein the pattern element extends in parallel to a direction perpendicular to the end face.

4. The light guide plate according to claim 1, wherein the pattern elements are arranged radially.

5. The light guide plate according to claim 1, wherein, viewing from a direction perpendicular to the top face of the light guide plate body, the pattern elements pass through light emission center of a light source disposed so as to face the end face, and are arranged in each of two regions of one region and the other region separated by an axis perpendicular to the end face, and the pattern elements in the one region and those in the other region are inclined in directions opposite to each other.

6. The light guide plate according to claim 1, wherein the light emitting surface comprises a lenticular lens extending in parallel to a direction perpendicular to the end face.

7. A surface light source device comprising:
the light guide plate according to claim 1; and
a light source configured to transmit light to the end face of the light guide plate.

8. A liquid crystal display device comprising:
the light guide plate according to claim 1;
a light source configured to transmit light to the end face of the light guide plate; and
a liquid crystal panel disposed so as to face the light emitting surface of the light guide plate.

9. A mobile device comprising the liquid crystal display device according to claim 8.

10. A light guide plate comprising:
a light introduction part comprising an end face configured to have light incident thereon; and
a light guide plate body disposed continuously to the light introduction part and comprising a thickness smaller than a maximum thickness of the light introduction part,
wherein the light guide plate body comprises a light emitting surface that emits the light incident from the end face,
wherein the light introduction part comprises an inclined face disposed on at least one side of the light guide plate,
wherein the inclined face is inclined smoothly from a surface of a part thicker than the light guide plate body toward an end of the light guide plate body,
wherein an optical pattern part comprising a linear pattern element is disposed near a region in a proximity of the inclined face in a face on a light exit side of the light guide plate body,
wherein the optical pattern part is formed such that a ridge line and a valley line are alternately arranged along a width direction of the light guide plate, in a region configured to be positioned in front of a light source opposite the end face, and comprising a width equal to that of the light source, in a section of the optical pattern part cut in parallel to the end face,
wherein a slant face connecting any of the ridge lines of the optical pattern part and one of valley lines adjacent to the ridge line and a slant face connecting the ridge line and the other valley line adjacent to the ridge line are asymmetric with respect to a straight line passing through the ridge line and perpendicular to the light emitting surface, and
wherein at least one set of the asymmetric shape parts comprising different shapes exists on both sides of a plane passing through center of light emission of the light source and perpendicular to the end face and the light emitting surface.

11. The light guide plate according to claim 10,
wherein in the region, and as at least one of two regions separated by the plane, when a normal is set to a slant face connecting a ridge line and a valley line which are adjacent in the optical pattern part, from the inside to the outside, a sum of breadths of the slant faces in which the normal is inclined toward the plane side is larger than a sum of breadths of slant faces in which the normal is inclined toward the side opposite to the plane.

12. The light guide plate according to claim 11,
wherein in the region, breadth of the slant face in which the normal is inclined to the plane side in the normals set to the two adjacent slant faces is larger than or equal to the breadth of the slant face in which the normal is inclined to the side opposite to the plane.

13. The light guide plate according to claim 10, wherein at least a part of a valley line in the optical pattern part is located on the inner side of the light guide plate body more than the light emitting surface.

14. The light guide plate according to claim 13, wherein at least a part of a ridge line in the optical pattern part is located on the center side of the light guide plate body more than the light emitting surface.

15. A mobile device comprising
a light source configured to transmit light;
a light guide plate comprising:
a light introduction part comprising an end face on which light from the light source is incident; and
a light guide plate body disposed continuously to the light introduction part and comprising a thickness smaller than a maximum thickness of the light introduction part,
wherein the light guide plate body comprises a light emitting surface that emits the light incident from the end face,
wherein the light introduction part comprises an inclined face disposed on at least one side of the light guide plate,
wherein the inclined face is inclined smoothly from a surface of a part thicker than the light guide plate body toward an end of the light guide plate body,
wherein an optical pattern part comprising a linear pattern element is disposed near a region in a proximity of the inclined face in a face on a light exit side of the light guide plate body,
wherein the linear pattern element has a wedge projection shape or a groove projection shape,
wherein the optical pattern part is formed such that a ridge line and a valley line are alternately arranged along a width direction of the light guide plate, in a region configured to be positioned in front of a light source opposite the end face, and comprising a width equal to that of the light source, in a section of the optical pattern part cut in parallel to the end face,
wherein a slant face connecting any of the ridge lines of the optical pattern part and one of valley lines adjacent to the ridge line and a slant face connecting the ridge line and the other valley line adjacent to the ridge line are asymmetric with respect to a straight line passing through the ridge line and perpendicular to the light emitting surface,
wherein at least one set of the asymmetric shape parts comprising different shapes exists on both sides of a plane passing through center of light emission of the light source and perpendicular to the end face and the light emitting surface,
wherein in the region, and as at least one of two regions separated by the plane, when a normal is set to a slant face connecting a ridge line and a valley line which are adjacent in the optical pattern part, from the inside to the outside, a sum of breadths of the slant faces in which the normal is inclined toward the plane side is larger than a sum of breadths of slant faces in which the normal is inclined toward the side opposite to the plane,
wherein in the region, breadth of the slant face in which the normal is inclined to the plane side in the normals set to the two adjacent slant faces is larger than or equal to the breadth of the slant face in which the normal is inclined to the side opposite to the plane,
wherein at least a part of a valley line in the optical pattern part is located on the inner side of the light guide plate body more than the light emitting surface, and wherein at least a part of a ridge line in the optical pattern part is located on the center side of the light guide plate body more than the light emitting surface; and a liquid crystal panel disposed so as to face the light emitting surface of the light guide plate.

* * * * *